(No Model.)

J. F. GOODRIDGE.
NUT LOCK.

No. 260,861. Patented July 11, 1882.

Witnesses:
W. P. Preble Jr
W. W. Swan

Inventor:
James F. Goodridge.

UNITED STATES PATENT OFFICE.

JAMES F. GOODRIDGE, OF BOSTON, MASSACHUSETTS.

NUT-LOCK.

SPECIFICATION forming part of Letters Patent No. 260,861, dated July 11, 1882.

Application filed September 27, 1881. (No model.)

*To all whom it may concern:*

Be it known that I, JAMES F. GOODRIDGE, of Boston, in the State of Massachusetts, have invented a new and useful Improvement in Locks for Fish-Plate Nuts, of which the following is a specification.

The object of the invention is the production of a lock-plate which may be so applied to the four nuts of a fish-plate as to lock them all and yet require the temporary removal of but a single nut from the fish-plate during the process of its application; and the invention consists of a metallic plate provided with four lips or flanges to abut against the nuts of the four bolts used in securing the fish-plate to two adjoining rails, a hole to receive one of said bolts, and a slot to embrace the nut of another of the said bolts.

Figure 1:
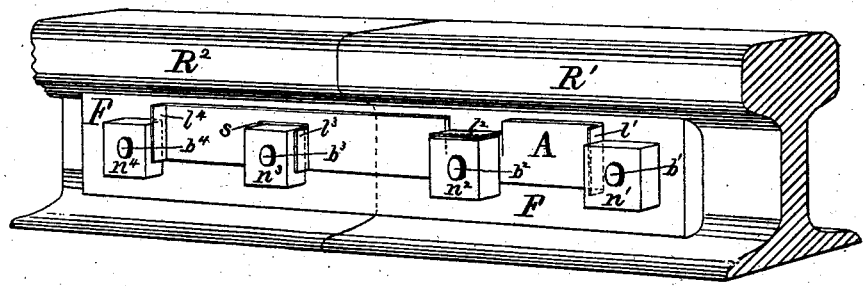
Figure 2:
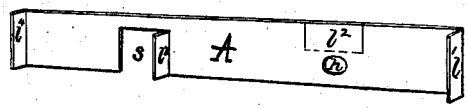
Figure 3:
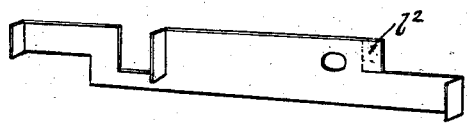
Figure 4:
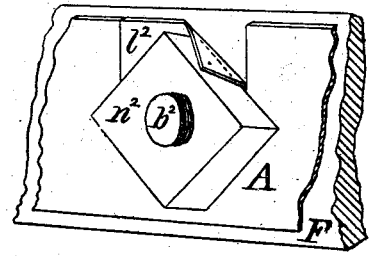

In the drawings, Figure 1 is a perspective view of a nut-lock embracing my said invention as applied to a fish-plate bolted to two rails. Fig. 2 is a similar view of the same nut-lock, detached. Fig. 3 is a view in perspective of a modified form of nut-lock within my said invention. Fig. 4 is a view, on an enlarged scale, illustrative of the manner in which, under certain circumstances, the locking-lip may be turned up against the movable nut.

The fish-plate is marked F, the two rails R' R$^2$, the four bolts $b'$ $b^2$ $b^3$ $b^4$, the four nuts $n'$ $n^2$ $n^3$ $n^4$.

A is the nut-lock plate, made of flexible iron or other suitable metal. There is cut therein a slot, $s$, adapted to fit the nut $n^3$ when the latter has been tightened upon its bolt $b^3$, as shown in Fig. 1. It has also a hole, $h$, through which the bolt $b^2$ passes when the plate A is applied to the fish-plate, as also shown in Fig. 1. The plate A has also four lips, $l'$ $l^2$ $l^3$ $l^4$, two of which, $l'$ and $l^4$, are formed by merely turning up the ends of the plate, as shown. In practical operation these end lips serve to lock respectively the outer nuts, $n'$ $n^4$, and are turned up before the plate A is applied to the fish-plate. With some kinds of metal, flanges or shoulders cast with or hammered from the metal would answer for the lips thus formed. The lip $l^3$ is formed by increasing the length of the longitudinal cut made in cutting the slot $s$. In practical operation this lip also is turned up before the lock-plate is applied to the fish-plate. The lip $l^2$, as shown in Figs. 1, 2, and 4, is formed by making two cuts from the upper edge of the plate near the hole $h$, one on either side of said hole. For a purpose which will presently appear the length of these cuts should exceed the distance between the top of the nut $n^2$ and the upper edge of the plate A when the said nut is screwed to the position shown at Fig. 1. The lip $l^2$ is not turned up when the lock-plate is first applied to the fish-plate, but lies in the plane of the lock-plate, the process by which the nut-lock, as a whole, is applied being as follows: The nut $n^2$ is first removed from its bolt $b^2$ and the nut lock or plate A so applied to the fish-plate F that the bolt $b^2$ passes through the hole $h$, while the slot $s$ fits loosely about the nut $n^3$. The lips $l'$, $l^3$, and $l^4$ will rest against the nuts $n'$, $n^3$, and $n^4$, as shown in Fig. 1. The nut $n^2$ is then screwed tight upon its bolt $b^2$, and the lip $l^2$ turned over upon it. If in tightening the nut $n^2$ it comes square with the edge of the plate A, the lip $l^2$ will be turned over, as shown in Fig. 1; but if the nut, when tightened, is not square with the plate the length of the cuts in the plate forming the lip $l^2$ allows that lip to be turned over at a suitable angle, as shown in Fig. 4. If the nuts $n'$, $n^3$, and $n^4$ are not square with the plate A when tightened, they may be slightly loosened before the plate is applied.

The important feature of this nut-lock is the slot $s$, since by its use a plate which serves as a washer and a guard for a nut on one side of the slot may serve also as a guard for a nut on the other side of the slot and for a nut within the slot.

It is obvious that the object of my invention may be attained in a lock-plate formed otherwise than precisely as above described and as shown in Figs. 1 and 2, it being only essential that there shall be a hole for one of the bolts, a slot for one of the nuts, and lips, flanges, or shoulders for all the nuts. One of several forms which would obviously come within my invention is shown at Fig. 3, the lip $l^2$ of that figure taking the place of the lip $l^2$ of the other figures.

It will be observed that the plate shown at Fig. 3 has been cut from the plate of stock upon the interlocking plan with a view to save material.

I claim—

A plate of flexible metal provided with four lips adapted to abut against or be turned against the nuts of the four several bolts used in securing a fish-plate to its rails, a hole for receiving one of said bolts, and a slot to embrace the nut of another of said bolts, substantially as described, for the purpose specified.

JAMES F. GOODRIDGE.

Witnesses:
W. P. PREBLE, Jr.,
W. W. SWAN.